United States Patent
Ozim (10) Patent No.: US 10,976,262 B2
(45) Date of Patent: Apr. 13, 2021

(54) MOBILE AND AUTOMATED APPARATUS FOR THE DETECTION AND CLASSIFICATION OF DAMAGES ON THE BODY OF A VEHICLE

(71) Applicant: AUTOSCAN GMBH, Alsdorf (DE)

(72) Inventor: Matej Ozim, Landshut (DE)

(73) Assignee: AUTOSCAN GMBH, Landshut (DE)

( * ) Notice: Subject to any disclaimer, the term of this patent is extended or adjusted under 35 U.S.C. 154(b) by 4 days.

(21) Appl. No.: 16/468,417

(22) PCT Filed: Jan. 8, 2018

(86) PCT No.: PCT/EP2018/000009
§ 371 (c)(1),
(2) Date: Jun. 11, 2019

(87) PCT Pub. No.: WO2018/130421
PCT Pub. Date: Jul. 19, 2018

(65) Prior Publication Data
US 2020/0011808 A1    Jan. 9, 2020

(30) Foreign Application Priority Data
Jan. 11, 2017 (IT) .............................. 2017000002416

(51) Int. Cl.
*G06K 9/00* (2006.01)
*G01N 21/88* (2006.01)
(Continued)

(52) U.S. Cl.
CPC ..... *G01N 21/8806* (2013.01); *G01B 11/2513* (2013.01); *G01B 11/2522* (2013.01); *G01B 11/306* (2013.01); *G01N 21/8851* (2013.01)

(58) Field of Classification Search
CPC .......... G01N 21/8806; G01N 21/8851; G01B 11/2513; G01B 11/2522; G01B 11/306;
(Continued)

(56) References Cited

U.S. PATENT DOCUMENTS 5,726,705 A * 3/1998 Imanishi ............ G01N 21/8806
348/92
7,164,117 B2 * 1/2007 Breed ............... B60R 21/01516
250/208.1
(Continued)

FOREIGN PATENT DOCUMENTS

AU      2013101009        8/2013
CN      105913410 A *     8/2016 ............... G07C 5/08
(Continued)

*Primary Examiner* — Mahendra R Patel
(74) *Attorney, Agent, or Firm* — Duane Morris LLP; Gregory M. Lefkowitz; Brandon A. Chan (57) ABSTRACT

A mobile and automated apparatus for the detection and classification of damages on the body of a vehicle, specifically meaning by "damage" a dent or a depression on the vehicle body caused by pressure applied on such body by an external object (hail-stone or other), characterized in that it comprises a support structure defining a passage area for a motor vehicle having a body; the support structure comprises: lighting means adapted to project a grid pattern on the surfaces of the body, speed sensor means adapted to measure the speed of the vehicle, distance sensor means adapted to measure the distance of the body surfaces from the support structure, and image recording means adapted to capture moving images of the pattern reflected by the surfaces; the apparatus comprises a unit processing the moving images of the pattern reflected by the surfaces and captured by the image recording means, and simultaneously processing the signals from the sensor means of distance and speed, in order to detect, count, classify and record damages on the car body.

7 Claims, 4 Drawing Sheets

Components
1: Apparatus
2: Support structure
5: Grid lighting means
6: Speed sensor means
7: Sensor means
8: Sensor means (51) Int. Cl.
*G01B 11/25* (2006.01)
*G01B 11/30* (2006.01)

(58) Field of Classification Search
CPC . B60R 21/0152; B60R 21/0153; A61B 3/107; B01D 2251/2062; B01D 2251/2967
USPC .......................................................... 382/149
See application file for complete search history.

(56) References Cited

U.S. PATENT DOCUMENTS

| | | | |
|---|---|---|---|
| 9,586,138 B2* | 3/2017 | Wei | A63F 13/27 |
| 9,886,771 B1* | 2/2018 | Chen | G06F 3/04845 |
| 10,007,981 B2* | 6/2018 | Gangitano | G07C 5/0808 |
| 10,169,856 B1* | 1/2019 | Farnsworth | G06T 7/254 |
| 10,255,521 B2* | 4/2019 | Amico | H04N 1/6002 |
| 10,438,293 B2* | 10/2019 | Andrade | G06Q 40/08 |
| 10,576,907 B2* | 3/2020 | Simula | B60R 11/04 |
| 2007/0146728 A1 | 6/2007 | Pristner | |
| 2007/0253692 A1* | 11/2007 | Terada | G03B 13/18 396/89 |
| 2011/0126617 A1* | 6/2011 | Bengoechea Apezteguia | G01B 9/02027 73/146 |
| 2011/0196551 A1* | 8/2011 | Lees | F41H 11/02 701/14 |
| 2012/0297337 A1* | 11/2012 | St. Denis | G08G 1/168 715/810 |
| 2014/0201022 A1* | 7/2014 | Balzer | G06T 7/0002 705/26.4 |
| 2015/0091718 A1* | 4/2015 | Niemann | G07C 5/0816 340/436 |
| 2015/0212189 A1* | 7/2015 | Kneifel | G01S 3/80 367/125 |
| 2017/0010356 A1* | 1/2017 | Demirel | G01B 11/25 |
| 2017/0106885 A1* | 4/2017 | Singh | G01B 11/22 |
| 2017/0169369 A1* | 6/2017 | Garnavi | G06K 9/00288 |

FOREIGN PATENT DOCUMENTS

| | | | | |
|---|---|---|---|---|
| CN | 106051573 A | * | 10/2016 | ............. F21S 41/37 |
| CN | 109034266 A | * | 12/2018 | |
| DE | 102007013883 | | 10/2008 | |
| DE | 102010015566 | | 10/2011 | |
| JP | 58014027 A | * | 7/1981 | ............. G07C 5/08 |
| JP | 58014027 A | * | 1/1983 | ............. G07C 5/08 |
| JP | 02300617 A | * | 5/1989 | ............. G07C 5/08 |
| JP | H09280845 | | 10/1997 | |
| JP | H1096615 | | 4/1998 | |
| JP | 2003148953 A | * | 11/2001 | ............. G01C 3/06 |

\* cited by examiner

Components
1: Apparatus
2: Support structure
5: Grid lighting means
6: Speed sensor means
7: Sensor means
8: Sensor means

Fig. 1

Components
7: Sensor means
9: Sensor means
10: Camera
11: Signal emitter

Components
5: Grid lighting means
21: Lateral module
23: Upper central module

MOBILE AND AUTOMATED APPARATUS FOR THE DETECTION AND CLASSIFICATION OF DAMAGES ON THE BODY OF A VEHICLE

CROSS-REFERENCE TO RELATED APPLICATIONS

This application is a § 371 national stage entry of International Application No. PCT/EP2018/000009, filed Jan. 8, 2018, which claims priority of Italian National Application No. 102017000002416, filed Jan. 11, 2017, the entire contents of which are incorporated herein by reference.

The present invention refers to a mobile and automated apparatus for the detection and classification of damages on the body of a vehicle, in particular of a vehicle such as a car, and specifically meaning by "damage" a dent or a depression on the vehicle body caused by pressure applied on such body by an external object, such as hail-stone or other.

Hailstorms, which are unpredictable local and natural events, often cause damage to a vast number of motor vehicles.

Insurance experts, who manually estimate surface damage on each vehicle, firstly visually check damaged vehicles. Detection of damage on each vehicle is tedious and slow, yet it has to be performed quickly because of the vast number of damaged vehicles during catastrophic events, such as hailstorms. Quick estimations of surface damages are generally inaccurate, and inaccurate estimations of damages lead to wrong cost predictions for insurances and also encourage repair workshops to report more damage repairs per vehicle than actual amount of damages per vehicle. Automated systems for damage detection, such as the one disclosed in the present invention, support the work of insurance experts by performing quicker and more objective counting of damages and prevent possible abuses due to inaccurate damage estimations.

US20070146728A1 discloses a system for detecting and determining damages on motor vehicles using reflective properties of observed objects. Such system uses a special chamber with braces, which enables precise movement of light source, a deflection screen, a signal processing device. A complicated manipulation system enables that each inspected surface can be brought into the reflection position with respect to the light source and to the screen. This enables detection of low contrast surface damages on all vehicle surfaces. In addition, since vehicles are stationary during screening, the position of damages can be determined with an appropriately calibrated system. However, the deflection screen only scans a small surface area at a time, therefore the scanning time of each vehicle is long. Moreover, the chamber-like system is stationary and bound to a certain site, and is not transportable.

DE102010015566B4 discloses another chamber-like system for detecting and determining damages on motor vehicles. The system entails recording, with cameras, of a pattern generated on a lit surface. Instead of the complicated manipulation system, described in US20070146728A1, the system described in DE102010015566B4 uses large light-emitting walls with a certain pattern and twelve cameras to cover all vehicle surfaces. Also, the system in DE102010015566B4 scans stationary vehicles, however, it can perform the scans significantly quicker than US20070146728A1 due to the possibility of simultaneously scanning more surfaces. Nevertheless, DE102010015566B4 describes a stationary chamber-like system which is not suitable for being transported in hail-affected areas.

DE102007013883A1 discloses a system using laser-scanning technology for detection of damages on motor vehicles. The system is theoretically valid, since the laser technology enables detection of shallow and low contrast surface damages, such as hail damages. However, such system is not used in practice because the use of laser technology on objects such as vehicles has two major problems. Firstly, laser-scanning technology generates a lot of spurious signals in the images, therefore the software has to distinguish between non-flat elements of the vehicle surface, actual surface damages and spurious signals created by the laser scanning itself. This fact makes the analysis software complicated and the detection of actual damages less reliable. Secondly, a single pass of a vehicle through the system means that each defect is scanned only once, which further reduces the reliability of damage detection. Such system is not suitable for practical use.

AU2013101009A4 discloses a system for the detection of damages on motor vehicles using video-cameras, lighting and special software, however, without any additional special technology, such as fringe reflection measurements. Therefore, the video-camera system, as described, does not enable automated detection of smaller and low contrast damages, such as hail damages. The video-camera system acquires video of each vehicle, and the damage on each vehicle is visible in several consecutive images. Therefore, damage counting and position localization of damages is possible only with known damage correspondences on images. The system disclosed in AU2013101009 incorporates no detection technologies, which makes accurate counting possible only manually on recorded videos. By contrast, the present invention automates the most difficult and error-prone process, which is that of identifying, counting, localizing and classifying numerous damages, such as dents caused by hail, on a vehicle body. Currently, the system described in the AU2013101009 is not suitable for automated motor vehicle hail damage detection.

GB2308656A discloses a system for the automatic detection of defects on a vehicle body in a production chain. The defects may be any anomaly of the body surface, such as a deformation of the surface or a defect in the paint. The apparatus must be pre-adjusted and optimized to detect and classify defects on a given body shape. The apparatus disclosed in GB2308656A is not able to detect and classify damages on any car of any shape. GB2308656A has a plurality of image sensors, which are a high number of cameras, each trained and focused on a specific small portion of the vehicle body. Each camera detects the level of brightness inside said portion and compares it with the level of brightness expected. A variation in the level of brightness compared to the one expected can indicate a possible defect. The movement of the vehicle body under the apparatus and the alternation of bright and dark patterns (white and black stripes) projected on the vehicle body are used to separate noise from a true defect, by repetition of subsequent detections. The localization of the defect depends from the synchronization with a constant and known speed and from the training of the camera (X and Y coordinates). Therefore, the key elements of the method and technologies of GB2308656A are: brightness detection and comparison of said brightness with an expected and pre-determined brightness, contained in a pre-defined "reference model" which is specific and unique for the shape of the vehicle body to be examined. This is further underlined by the fact that the whole apparatus must be "shaped substantially in conformity with the contour of the vehicle body", and that each image sensor must be placed at a distance which "changes according to the shape of the vehicle body".

JPH09280845(A) discloses a system similar to GB2308656A. JPH09280845(A) discloses an apparatus wherein a defect detection means judges whether or not the defect candidates existing in each of the continuously extracted defect candidate images in each direction processed in time series conform to movements and prescribed fixed conditions.

US2014/0201022A1 discloses another system for the detection and classification of damages on motor vehicles. US2014/0201022A1 contains a wide list of techniques with many possible applications, but does not disclose a usable product or apparatus.

The aim of the present invention is to provide a mobile and automated apparatus for the detection and classification of damages on bodies, and more specifically meaning by "damage" a dent or a depression on the vehicle body caused by pressure applied on such body by an external object (hail stone or other), which overcomes the problems of the prior art cited above.

Within this aim, an important object of the invention is that of providing an apparatus which easily transportable.

A further object of the invention is that of providing an apparatus which allows to execute the detection and classification of damages in a fast way without requiring the intervention of a human operator who has to visually and manually detect, count and classify said damages.

A further object of the invention is to provide an apparatus which allows to execute the detection and classification with a high degree of precision.

The above aim and objects, and other objects that will be more apparent hereinafter, are achieved by a mobile and automated apparatus for detection and classification of damage on vehicle bodies, characterized in that it comprises a support structure defining a passage area for a motor vehicle having a body; said support structure supporting lighting means adapted to project a grid pattern on the surface of said body; said support structure further supporting speed measurement means adapted to measure the speed of said vehicle in said passage area, distance measurement means to measure the distance of the vehicle body from the support structure, and image recording means to capture moving images of said pattern reflected by said surfaces; said apparatus further comprising an image processing unit that processes said pattern reflected by said surfaces and captured by said image recoding means, and simultaneously processes the signals from said speed and distance measurement means, in order to count and classify damages on said car body.

The above aim and objects, and other objects that will be more apparent hereinafter, are also achieved by a method for detecting and classifying damages on a vehicle body.

Further characteristics and advantages of the invention will be more apparent by the following description of an embodiment of the invention, illustrated, by way of example in the enclosed drawings in which.

With reference to said figures, the automated and mobile apparatus according to the invention, globally indicated with reference number 1, comprises a support structure 2, shaped as an arch, which defines a passage area 3, through which a vehicle 4 to be inspected is driven.

Figure 1:
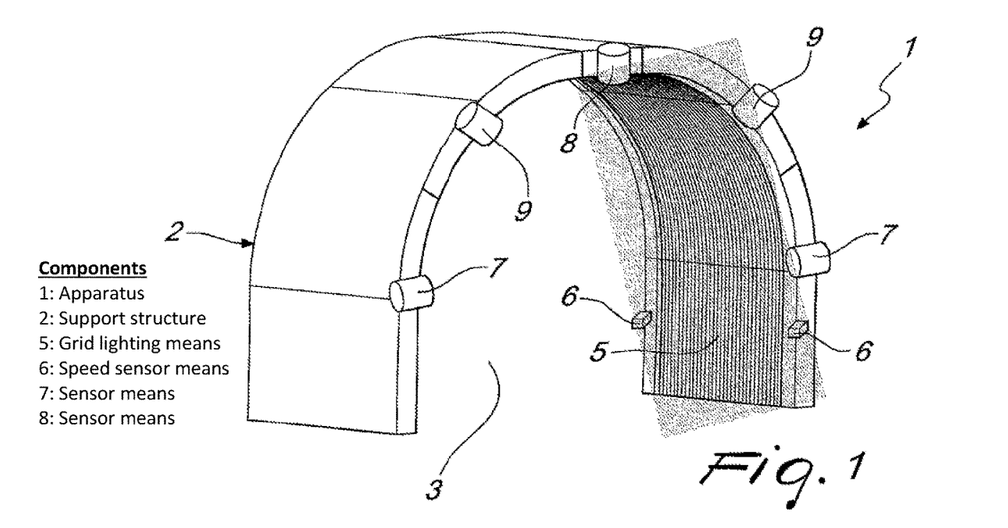
FIG. 1 is a perspective view schematically illustrating the automated and mobile apparatus for the detection and classification of damages on motor vehicles, according to the present invention.

The support structure 2 supports grid lighting means 5, adapted to light the passage area 3 and therefore all the surfaces of vehicle 4 to be inspected.

Figure 2:
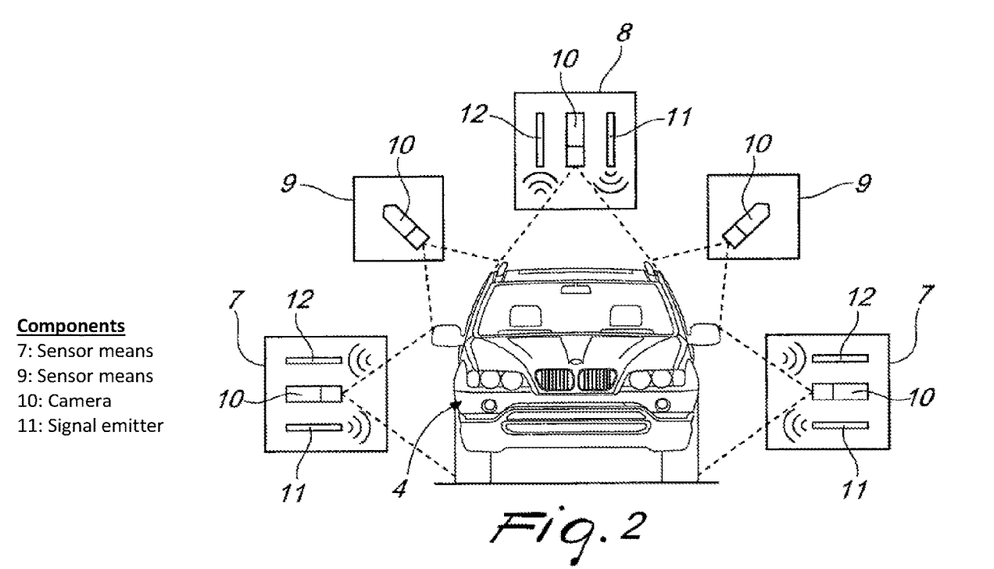
FIG. 2 is a front view schematically illustrating the position of all the sensor means of the apparatus in relation to the vehicle being scanned.

The support structure 2 further supports speed sensor means 6, adapted to measure the speed of vehicle 4, lateral sensor means 7, upper sensor means 8 and diagonal sensor means 9.

Sensor means 7, 8 and 9 are adapted to measure the distance of the surfaces of vehicle 4 and to produce images of said surfaces.

More in detail, the lateral sensor means 7 and the upper sensor means 8 each comprise a camera 10, or other image capture device, and a distance-measuring device having a signal emitter 11 and a signal receiver 12.

Advantageously, the support structure 2 is built in separate modules which can be assembled in a univocal way.

Figure 6:
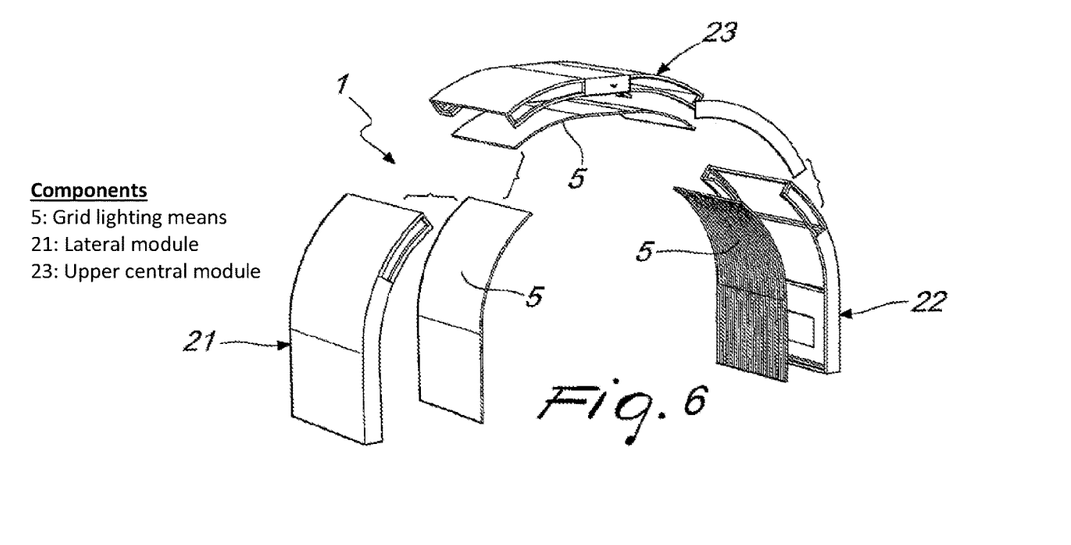
FIG. 6 is an exploded view of the apparatus according to the invention.

In the illustrated example, the structure 2 comprises two lateral modules 21 and 22 and an upper central module 23.

The apparatus 1 according to the present invention allows to make an accurate detection of damages on the body of vehicle 4, in particular counting said damages, positioning them on the vehicle, dimensionally classifying them, providing a report. The apparatus also allows the recording and storage of the analyzed video images.

Within the scope of the present invention, the term damage specifically means a dent or a depression on the vehicle body caused by pressure applied on such body by an external object, such as hail stone or others.

The only task executed by the human operator is that of driving the vehicle through the passage area 3 of the apparatus 1. The apparatus measures the speed of the vehicle, the distance of the vehicle surfaces from the cameras 10 and records the video images of the surfaces of said vehicle.

The speed is measured by the speed sensor means 6, which comprise two or more presence sensors, spaced out from each other, and a timer.

The passing vehicle firstly interrupts the first presence sensor and subsequently the second presence sensor. Each sensor records the time of interruption. Knowing the physical distance between the sensors and the difference of the interruption time, the vehicle speed can be determined.

The sensor means 7, 8 and 9 are able, thanks to the respective cameras 10, to cover the whole surface of the vehicle along the shortest vehicle axis, i.e. the axis perpendicular to the driving direction.

The lateral sensor means 7 and upper sensor means 8 each further comprise a device for measuring the distance consisting in a signal emitter 11 and a signal receiver 12.

Preferably, the exposition of all the sensor means 7, 8 and 9 may be adjusted in order to adapt the exposition to the vehicle color and in order to optimize the contrast of the pattern reflected by the vehicle surfaces.

By means of the distance measurement devices 11, 12, the image processing system has the information on the distance of the inspected surface from the camera. The vehicle surfaces which are further way from the sensor means have a lower resolution compared to the surfaces which are closer to the sensor means.

Figures 3, 4:
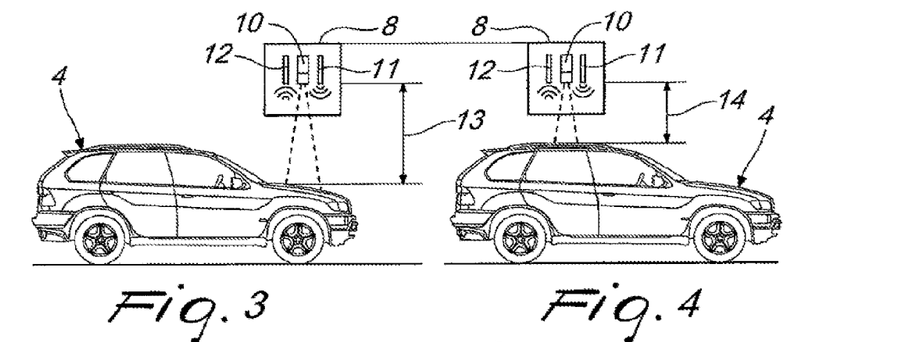
FIG. 3 is a side view schematically illustrating the typical working distance of the upper sensor system of the apparatus in relation to the front part of the vehicle.
FIG. 4 is a side view schematically illustrating the typical working distance of the upper sensor system of the apparatus in relation to another part of the vehicle.

FIG. 3 shows an example of a greater distance 13 from the vehicle surface, in this case the bonnet, from the camera 10 of upper sensor means 8.

FIG. 4 shows an example of a lesser distance 14 from the vehicle surface, in this case the roof, from the camera 10 of upper sensor means 8.

The distance measurements provided by the distance measurement devices 11, 12, are used by the processing system to accurately convert the damage dimensions from pixel units into physical units.

The distance measurement can be made with different techniques, such as TOF (Time of Flight) or the laser triangulation technique.

Figure 7:
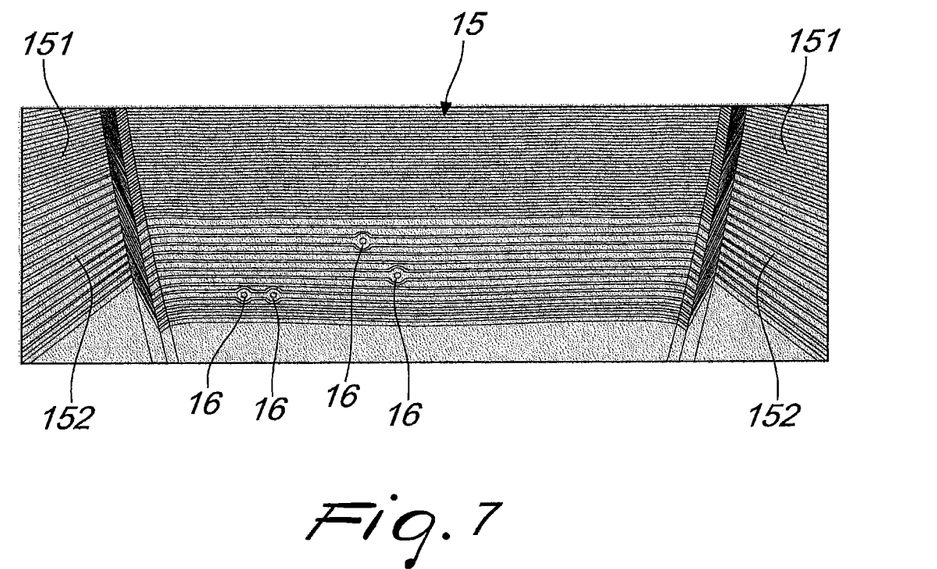
FIG. 7 shows an example of image acquired by the upper sensor system of the present invention.

FIG. 7 shows an example of image 15 detected by the upper sensor system of the present apparatus.

Preferably, the grid 5 consists of two portions: a thin grid portion 151 and a thick grid portion 152.

The thin grid portion 151 allows to obtain a greater sensitivity to damages, however it can only be used for inspecting surfaces which are close to the cameras, where the working distance is short. The thick grid portion 152 allows a lower sensitivity to damages, however it can also be used for surfaces further away from the cameras.

The double grid 151, 152 allows to make the scan of different components of the vehicle (bonnet, roof) and allows to make the scan of vehicles of different heights.

Figure 8:
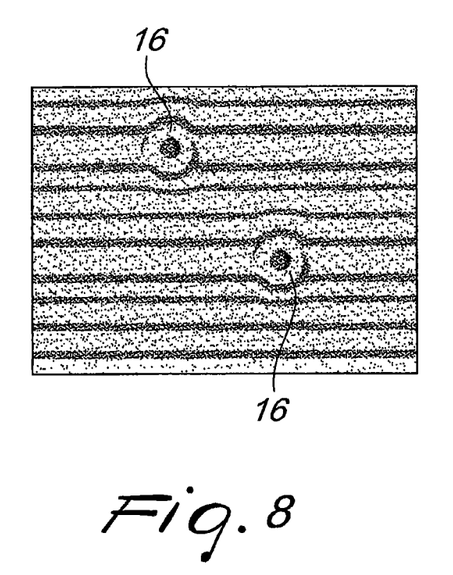
FIG. 8 shows an example of pattern reflected by a damaged reflecting surface of the vehicle.

FIG. 8 schematically shows the pattern reflected on the damaged surface of the vehicle. The pattern is locally distorted around damages 16. Such distortions in the reflected pattern are detected through the method of image analysis of the present invention.

FIGS. 3 and 4 illustrate the typical working distance of the upper sensor means 8 from the inspected vehicle surface. Such distance varies significantly for the different types of vehicles as well as for each single vehicle due to the fact that the roof and bonnet are at different distances from the sensor means. The upper sensor means 8 must operate at great working distances 13 as well as at small working distances 14.

Figure 5:
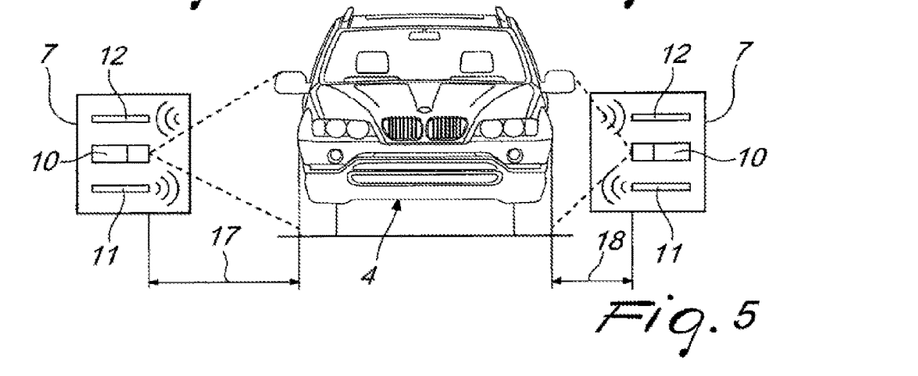
FIG. 5 is a front view schematically illustrating the typical working distance of the side sensor system of the apparatus in relation to the vehicle.

FIG. 5 illustrates the typical working distance of the lateral sensor means 7. Preferably, the working distance of the lateral sensor means 7 from the vehicle surface is the same on both sides of the vehicle, i.e. the vehicle should be driven centrally within the passage area, however the lateral working distance, indicated with reference numbers 17 and 18 in FIG. 5, varies in any case according to the different types of vehicles, due to the different widths of the vehicles.

The measurements of the vehicle speed and of the distance from the inspected surface for each sensor means are used to precisely calculate the vehicle movement between two subsequent video images in pixel units, which allows to keep track of the damages detected in the video, i.e. allows to find a correspondence of the damages in consecutive images.

FIG. 6 is an exploded view which shows the support structure 2 broken into its components: two lateral modules 21 and 22 and an upper central module 23.

A single operator can perform all the operations for assembly and disassembly of such components.

Advantageously, the sensor means are integrated into each module and the three modules can be assembled in a univocal way, without possibility of error.

The sensor means 7, 8 and 9 are integrated into the modules 21, 22 and 23 in a permanent way when manufacturing the modules.

Once the apparatus is assembled, before its first use, all the sensor means are calibrated. Nevertheless, after the first calibration, the permanent integration of the sensors in the modules allows for an instantaneous use of the device even after the disassembly and later re-assembly of the modules, and no further calibration of the system is needed.

Figure 9:
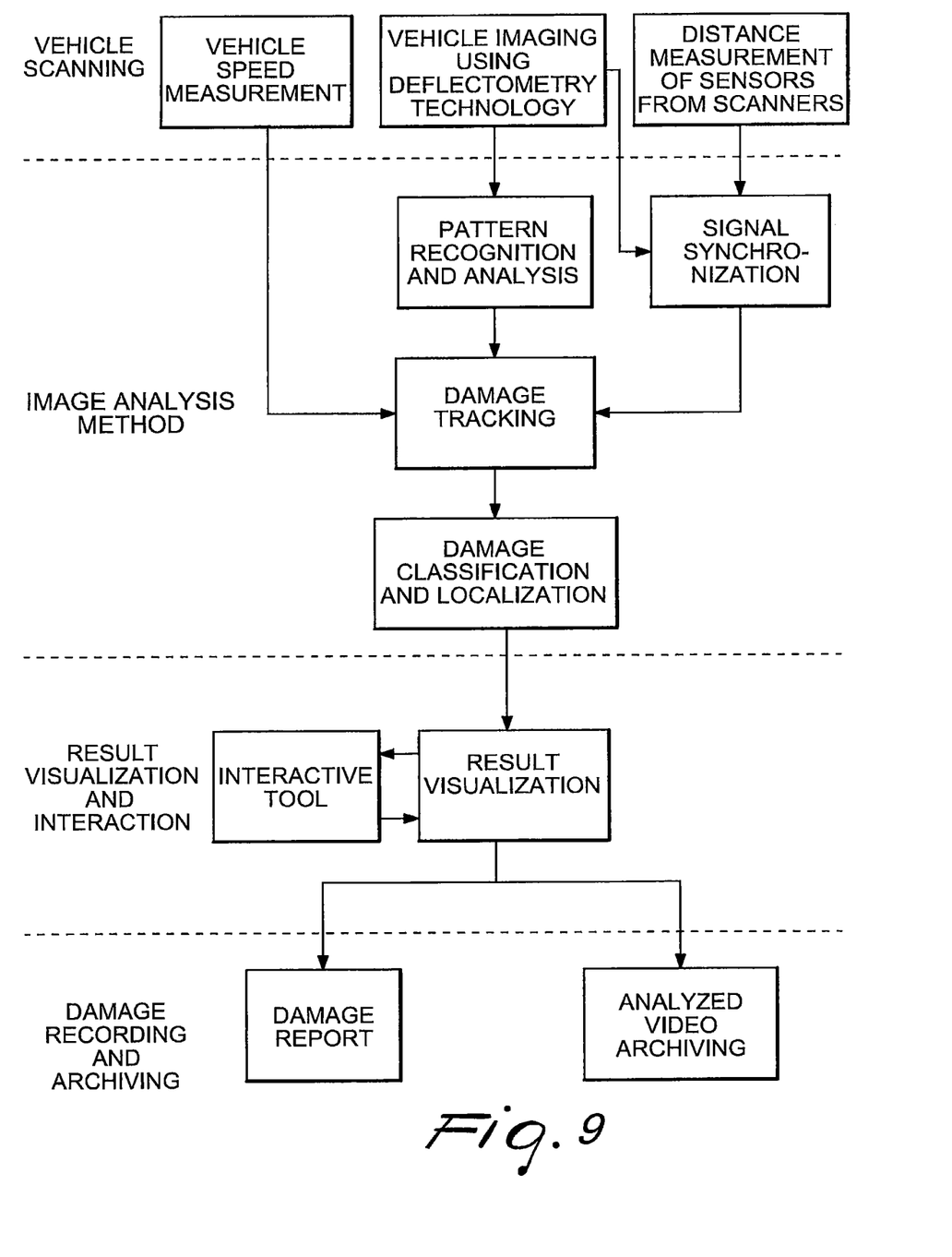
FIG. 9 is a block diagram showing the process of the present invention.

FIG. 9 is a block diagram which represents the method of analysis according to the present invention.

Scanning of a vehicle 4 is done by driving the vehicle through the passage area 3 of structure 2.

The apparatus 1 measures the speed of the vehicle 4, the distance of vehicle 4 from each of the sensor means 7, 8 and 9, and captures a video image of the vehicle surfaces using the deflectometry technique.

The acquired images are transferred to an image processing unit to make the analysis of said images according to the method of the present invention.

The method of analysis of the images comprises pattern recognition of inspected surfaces, pattern analysis, detection of possible damages, tracking of detected damages on video and classification of said damages.

The detected damages are tracked on video to distinguish real surface damages from possible detected damages and to allow the localization of the position of each detected damage on the vehicle.

The method also comprises an interactive tool which allows the operator to interact with the apparatus and with the results.

The method also comprises a system for providing a report and for the recording and storing the videos.

The distance measurements are synchronized with the video recording, allowing an accurate estimation of the distance of the inspected surface for each video image. The measurements allow the conversion of digital pixel units into physical units.

The pattern recognition, which can be carried out using several segmentation methods, determines the areas which must be analyzed for damages. The image analysis is thus carried out only for the relevant areas, and this greatly reduces the processing times and reduces the possibility of fake damage detections.

The surface damages are detectable as local distortions of the pattern reflected by the vehicle surface. The image analysis system detects the distortions and tags them as possible damages, and all possible damages are tracked on video.

The tracking on video of consecutive images is done by software systems which identify the most appropriate correspondences, for instance they search for the closest image incorporating the calculation of the vehicle movement (in pixel) between two consecutive images.

The vehicle moving speed, in pixel, is obtained from the measurement of the vehicle speed and of the working distance of sensors 13, 14, 17 and 18, i.e. the distance of the inspected surface from sensors 10. No markers are needed on the vehicle according to the present method.

Each possible damage must be detected on several consecutive images to be recognized as a surface damage. The possible damages which are not recognized as surface damages are considered fake surface damages and excluded from further analysis, counting and reporting.

All the detected surface damages are converted from pixel units into physical units and classified according to their sizes.

All detected damages are converted by an image coordinates system into a global vehicle coordinates system in order to identify the position of each damage. The localization of the position allows the counting of damages for each vehicle part and their visualization on the damage report.

The results of the automated analysis are visually presented to damage experts.

The system according to the present invention comprises an independent interactive tool which allows semi-automatic adding or removing of damages on the vehicle. If a damage is manually added or removed on a given image by an expert using the interactive tool, the damage is automatically added or removed in all corresponding video images, preceding and subsequent. The damage report and the counting of damages are correspondingly modified.

It has been noted in practice that the invention achieves the aim and objects by providing a mobile and automated apparatus, for the detection and the classification of body damages which is able to make an accurate scan of a vehicle which makes a single pass through the said apparatus.

The apparatus is adapted to all types of motor vehicles, such as cars and vans, and does not need the presence of markers on the body.

Preferably, the cameras 10 are high-frequency and high-resolution cameras.

All the cameras 10 and the distance measurement devices 11, 12 are able to make the measurements simultaneously.

A further advantage of the present apparatus consists in the fact that the vehicle can be driven through the passage area 3 at an arbitrary speed.

The present invention uses a low-number, typically 3 to 5, of high-definition cameras, each of which records moving images (videos) of the vehicle passing under the apparatus. Each camera generates a video which is analyzed by a proprietary shape recognition algorithm (FIGS. 7 and 8) that detects the body deformation (dent or depression) based on the fact that the reflected lines recorded by the cameras are not straight but curving around the dent or depression. Hence, the black and white stripes are essential to detect the damage, contrary to prior art systems such as in GB2308656A where they are used to confirm defect detections and eliminate false detections by repetition. The shape of the reflection is essential in the present invention and not the level of brightness as in GB2308656A.

According to the present invention, the shape, after processing by the proprietary algorithm, is used to determine the size and position of the dent or depression. Therefore, according to the present invention, any vehicle body of any shape can pass under the apparatus and the damages can be detected, and there is no need for a pre-determined "reference model" as in prior art systems, such as GB2308656A for example.

According to the present invention, there is no need for a conveyor belt or for a stable and known speed: cars can be driven at different speeds.

According to the present invention, there is no need of having the overall shape of the apparatus in conformity with the contour of the vehicle body, also there is no need to have pre-determined camera distances and the cameras are always in the same position, with the same adjustments for any vehicle type.

The distance sensors allow the proprietary shape recognition algorithm to work effectively. The system according to the present invention detects and classifies damages based on distorted shapes which are recognized by a proprietary algorithm, whereas prior art systems, such as GB2308656A, merely recognize brightness differences between the images received and the pre-determined reference model.

A further feature of the present invention is that the apparatus automatically detects and classifies the dents into any number of categories that can be defined by the operator while the prior art systems, such as US2014/0201022A1 for example, merely suggest to a classification of dents into three size categories: large-medium-small.

The invention claimed is:

1. A mobile and automated apparatus for detection and classification of damage on vehicle bodies, wherein it comprises a support structure defining a passage area for a motor vehicle having a body; said support structure supporting lighting means adapted to project a grid pattern on the surface of said body; said support structure further supporting speed measurement means adapted to measure the speed of said vehicle in said passage area, distance measurement means to measure the distance of the vehicle body from the support structure, and image recording means to capture moving images of said pattern reflected by said surfaces; said apparatus further comprising an image processing unit that processes said pattern reflected by said surfaces and captured by said image recoding means, and simultaneously processes the signals from said speed and distance measurement means to timely synchronize said distance measurements with said moving images in order to count and classify damages on said car body.

2. The apparatus, according to claim 1, wherein said image detection means comprises high resolution cameras.

3. The apparatus, according to claim 1, wherein said distance measurement means comprises a signal emitter and a receiver of said signals that are reflected by said surfaces.

4. The apparatus, according to claim 1, wherein said processing unit comprises an interactive tool configured to allow an operator to semi-automatically add and remove the detected damage.

5. The apparatus, according to claim 1, wherein said support structure comprises separate parts that can be associated in a univocal way.

6. A method for the detection and classification of damage on the car body of a motor vehicle, wherein it comprises the steps of:
leading a motor vehicle into a passage area that is lit by a grid pattern;
acquiring the images of said pattern that are reflected by the surfaces of the car body of the motor vehicle;
measuring the distance between said surfaces and said image acquisition means;
measuring the speed of said motor vehicle in said passage area;
timely synchronizing said distance measurements with said images;
analyzing the images of said pattern that are reflected by the surfaces of the car body and recognizing the damage on said surfaces as local distortions of said reflected pattern;
tracking damages through consecutives images;
filtering falsely detected damages from effective detected surface damages;

classifying said damages by size;
localizing the position of each damage on said car body of said moving motor vehicle;
recording the data concerning number, position and amount of all the detected damages;
using said distance measurements between said surfaces and the image acquisition means to convert digital pixel units of said images to physical measurement units.

7. The method, according to claim 6, wherein it comprises an interactive step in which a human operator adds or removes detected damages.

\* \* \* \* \*